Patented July 4, 1944

2,352,796

UNITED STATES PATENT OFFICE 2,352,796

WATER-SOLUBLE BIURET RESIN AND METHOD FOR MAKING THE SAME

Earle Davis McLeod, Rumford, R. I., assignor to Arnold, Hoffman & Co. Incorporated, a corporation of Rhode Island No Drawing. Application June 21, 1941,
Serial No. 399,234

14 Claims. (Cl. 260—2)

This invention relates to stable resinous products. Resins that are water soluble and at the same time cheap and readily available have considerable uses in the arts as adhesives, binders, as compositions for use in coatings and many other types of work in the paper and textile industries.

In U. S. Patent 1,953,741 to Bennett, July 15, 1932, water-soluble resinous products have been made by reaction of glycols or polyhydric alcohols, such as, ethylene glycol, diethylene glycol, etc., by reacting these with boric acid. While such products are water soluble, they have found only limited uses due to their unstability in particular, and water solutions soon after preparation become hazy due to the boric acid rapidly hydrolyzing and splitting out of the compound. The resin rapidly hydrolyzes and is soon completely destroyed, thereby limiting the uses of these products.

I have found that stable water-soluble resins may be prepared which may be kept for a long time in water solution without hydrolysis by reacting boric acid with biuret compounds characterized by containing an amino group. Boric acid is an inorganic acid and while its formula is generally given as, $H_3BO_3$, it is not considered to react as a polybasic acid, and upon heating it to relatively low temperatures, it easily gives up one mol of water and thereafter reacts according to the general formula for metaboric acid, ($HBO_2$). Its reactions in aqueous solutions have been frequently shown by physical chemical measurements to indicate the formula $HBO_2$ rather than $H_3BO_3$. The organic esters of boric acid indicate an acid or composition $HBO_2$ rather than $H_3BO_3$. All chemical information indicates that boric acid $H_3BO_3$ is really a hydrate of the acid $HBO_2$ and is to be looked upon as $HBO_2-H_2O$.

In carrying out the invention I heat between 100 and 160° C. one or more mols of boric acid with biuret or a substituted biuret of the following general formula:

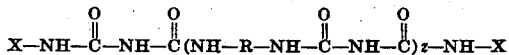

In this formula $z$ is a small whole integer of value from 0 to 3 and in which R is a group of the following type:

$$-(CH_2)_t(NH(CH_2)_t)_s-$$

where $t$ and $s$ are small whole integers, $s$ ranging from 0 to 5 and $t$ ranging from 1 to 5. X may be hydrogen or may represent one of several types of groups, such as, $-(CH_2)_n-Y$, in which Y is either hydroxyl (OH) or amino ($NH_2$) carrying a reactive hydrogen. X also may stand for alkyl polyamino chains such as, $$-(CH_2)_n(NH(CH_2)_n)_p-Y,$$

in which Y has the foregoing meaning and $n$ and $p$ are small whole integers with $n$ varying from 2 to 6 and $p$ ranging from 1 to 6. X may also indicate simple branched alkyl chains or groups containing not over 5 carbons in which at least one hydroxyl or amino group appears.

These water-soluble resinous condensates of boric acid with biurets are characterized by at least one group such as,

It is not necessary that the two X's be alike. Suitable alkyl biuret compounds for condensations with boric acid to secure water-soluble resins are as follows:

Biuret

Monoethanol biuret

Monobeta amino ethyl biuret

Hydroxyethyl ethylene diamine biuret

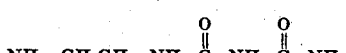

Diethylene triamine biuret

2 methyl, 2 biuret propanol

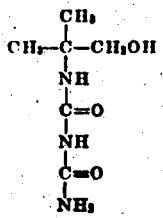

2 methyl, 2 biuret, 1,3 propanediol

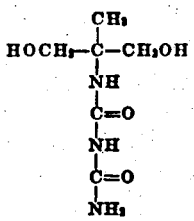

2 methylol, 2 allophanamide, 1,3 propanediol

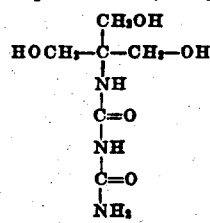

Symmetrical diethanol biuret

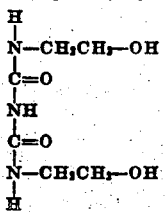

Symmetrical-dibeta-amino-ethyl biuret

Symmetrical hydroxyethyl ethylene diamine biuret

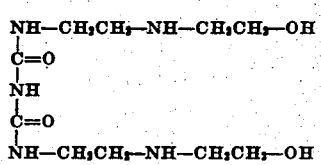

Ethylene diamine di-biuret

In the preparation of these alkyl biuret compounds biuret may be formed separately from 2 mols of urea by heating at 160° C. and thereafter heating with an appropriate amine to form the substituted biuret compounds, such as those listed above. They may also be formed by heating the alkyl amine and more than 1 mol of urea together at a temperature of 135-140° C., at which temperature ammonia is split out, and on holding for at least one-half hour, the biuret linkage is formed without going through the extra process of making the biuret separately, and simultaneously with the formation of the biuret linkage the amine reacts to produce the substituted biuret.

The detailed practice of the invention is illustrated by the following examples wherein the parts are given by weight:

*Example 1.*—62 parts of boric acid (1 mol) were mixed with 103 parts (1 mol) of biuret and gradually heated until water was collected in the side arm tube. Heating was continued until 150° C. at which point 2 mols of water were split out and the residue in the flask cooled down. This yielded a water-soluble, white, non-transparent resin hygroscopic in nature. The resin is readily soluble in water, and from such aqueous solution the resin can be again secured by drying down, thus indicating that the product is stable and does not hydrolyze. Water solutions may be kept without any apparent evidence of hydrolysis.

*Example 2.*—62 parts of boric acid (1 mol) were mixed with 120 parts (2 mols) of urea and gradually heated to 140° C. during which time 1 mol of ammonia and 2 mols of water were split out. This yielded a water-soluble, white, non-transparent resin, hygroscopic in nature, similar to that obtained in Example 1 where one mol of biuret was used directly.

*Example 3.*—103 parts (1 mol) of biuret were added to 61 parts (1 mol) of monoethanolamine and the temperature raised to 130-135° C. and held for one-half hour during which time 1 mol of ammonia was split off. To the monoethanol biuret thus formed was added 62 parts (1 mol) of boric acid and the temperature raised to 150° C., during which time 2 mols of water were split out. This yielded a water soluble, viscous product slightly yellow, transparent, and very hygroscopic in nature. The resin is readily soluble in water, and from such aqueous solutions the resin can be again secured by drying down, thus indicating that the product is stable and does not hydrolyze. The resin is very easily softened on heating and is permanently thermoplastic.

*Example 4.*—61 parts (1 mol) of monoethanolamine were mixed with 120 parts (2 mols) of urea and the temperature raised to 130-135° C. and held for one-half hour during which time 2 mols of ammonia were split out and a monoethanol biuret compound formed. To the biuret compound thus formed was added 62 parts (1 mol) of boric acid and the mixture heated to 150° C. during which time 2 mols of water were split off. The resinous condensate thus obtained was a water-soluble, viscous product slightly yellow, transparent and very hygroscopic in nature. Its general characteristics were similar to those obtained in Example 3 where the biuret was made as a separate condensation.

*Example 5.*—189 parts (1 mol) of symmetrical dibeta-aminoethyl allophanamide were mixed with 62 parts (1 mol) of boric acid and gradually heated until water was collected in the side arm tube. Heating was continued to 160° C. at which point 2 mols of water were split out and the residue in the flask cooled down. This yielded a hard, water-soluble resin, slightly hygroscopic in nature. The resin is readily soluble in water and does not hydrolyze from such aqueous solutions under long storage.

*Example 6.*—120 parts (2 mols) of urea were added to 105 parts (1 mol) of 2 methylol, 2 amino, 1,3 propanediol and the temperature raised to 130-135° C. and held one-half hour during which time 2 mols of ammonia were split off and the substituted biuret 2 methylol, 2 biuret, 1,3 propanediol formed. To this substituted biuret was added 62 parts (1 mol) of boric acid and the temperature raised to 150° C. during which time 2 mols of water were split out. This yielded a hard, red resin, water-soluble, transparent and non-hygroscopic in nature. Water solutions of this resin may be kept without any apparent evidence of hydrolysis and from such solution the resin may be obtained by drying down.

*Example 7.*—232 parts (1 mol) of ethylene diamine di-biuret

were mixed with 62 parts (1 mol) of boric acid and the temperature raised to 150° C., during which time 1½ mols of water were split out. The product obtained was a water-soluble, hard, white resin non-transparent and hygroscopic in nature. The resin is readily soluble in water and such solutions can be kept without any evidence of change.

It has been shown that water-soluble, viscous resins can be made by reacting boric acid and aminol amines or polyamines above 100° C. The aminol amines and polyamines are characterized by the presence of at least one amino group and a total of two or more hydroxy and amino groups. I may make these resins jointly with the resin here disclosed, or I may add my resin as plasticizers or modifiers to such resins.

*Example 8.*—A resinous condensate which may be obtained by reacting monoethanolamine (1 mol) and boric acid (1 mol) is water soluble, hard, slightly yellow, transparent, and nonhygroscopic in nature. As illustrated in Examples 3 and 4 above, the resinous product obtained by condensing monoethanol biuret and boric acid was sticky in nature and slightly hygroscopic. This may be used to plasticize the harder type resins secured from monoethanolamine and boric acid. By mixing the two resin condensates obtained from the condensation of monoethanolamine and boric acid and monoethanol biuret and boric acid in the ratio of 25 to 75 parts by weight, I obtain, upon drying down this mixture, a resinous film which was transparent, of medium hardness and slightly hygroscopic. This mixture yielded the same type of resinous film as would be obtained by making both condensates together. I can prepare a resinous composition showing the same properties as this mixture by direct condensation of boric acid with proportionate mixture of monoethanol biuret and monoethanolamine. Accordingly, 61 parts (1 mol) of monoethanolamine and 103 parts (1 mol) of biuret were mixed together and gradually heated to 130–135° C. and held at this temperature for one-half hour, during which time 17 parts of ammonia (1 mol) were evolved, indicating the formation of a monoethanol biuret. 50 parts (.966 mol) of monoethanolamine were then added, followed by 121 parts (1.95 mols) of boric acid, added rapidly, and the temperature was raised to 150° C., during which time 4 mols of water were evolved and the condensation of the 2 boric acid resins completed simultaneously. The resinous condensate thus formed cooled down to a water white, transparent, viscous, resin slightly hygroscopic in nature. The resin is readily soluble in water and from such aqueous solutions it may be again secured by drying down, thus indicating that the product is stable and does not hydrolyze. The resin is easily softened on heating and is permanently thermoplastic.

*Example 9.*—As previously disclosed, the biuret linkage

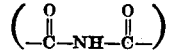

may be obtained by condensing biuret directly, which itself is made as a separate condensate, or the biuret linkage may be formed simultaneously during condensation by the use of more than one mol of urea at the time of reaction. Accordingly, I can prepare a resinous composition containing the same properties as stated in Example 8 by condensing monoethanolamine with excess urea in place of biuret. Accordingly, 144 parts (2.4 mols) of urea and 74.4 parts of monoethanolamine (1.2 mols) were mixed together and gradually heated until 130–135° C. was reached and held at that temperature for one-half hour during which time 2.4 mols of ammonia were evolved and the formation of the monoethanol biuret completed. 61 parts (1 mol) of monoethanolamine were then added and 139.5 parts (2.25 mols) of boric acid were added rapidly and the temperature raised to 150° C. during which time approximately 4½ mols of water were evolved and the condensation of the two boric acid resins completed simultaneously. The resinous condensate was similar in all characteristics to the condensate described in Example 8. The water solution of this condensate can be kept without any apparent evidence of change, and from such aqueous solution the resin can be again secured by drying down. The resin is easily softened on heating and is permanently thermoplastic.

*Example 10.*—As indicated previously, resinous condensations can be secured by reaction with boric acid and a polyamine compound. In place of the monoethanolamine used in the above Example 9, I may use equal molal quantities of diethylene triamine, thus I may first form the monoethanol biuret using the same weights as in Example 9 and thereafter add 103 parts (1 mol) of diethylene triamine followed by 139.5 parts (2.25 mols) of boric acid and heat this mixture up to a maximum temperature of 150° C. Cooling down, I secure a resin which is readily soluble in water, practically water white, transparent, and only slightly hygroscopic in nature. The resin is completely stable in aqueous solutions and may be secured again by drying down.

The above examples are given only by way of illustration and the use of various other substituted alkyl biurets carrying hydroxyl or amino groups result in various similar types of resinous products. In view of the fact that water and some ammonia are split out by the reaction of boric acid with amino or hydroxyl groups, it is to be presumed that the resinous products are formed in this manner. It is apparent that the high polymeric-chain resins formed must be rather complex chemical formulas, and it is not my intention in offering these suggested reactions as the source of the water and ammonia eliminated, that this is necessarily the only type of combination which occurs, and this application is not to be limited in terms of this type of interpretation.

The above descriptions and examples are intended to illustrate the nature of this invention, but the invention is not restricted to these examples.

I claim:

1. The process for the manufacture of a water-soluble resin which comprises reacting at temperatures exceeding 100° C. equimolecular quantities of boric acid and a biuret of the following general formula:

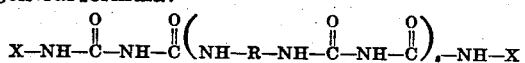

wherein z is a small integer of values from 0 to 3 and R is a group —(CH₂)ₜ—(NH(CH₂)ₜ)ₛ— where t and s are small integers with s ranging from 0 to 5 and t ranging from 1 to 5, and in which X is a radical selected from the group consisting of hydrogen,

—(CH₂)ₙ—Y, —(CH₂)ₙ(NH(CH₂)ₙ)ₚ—Y in which n and p are small integers with n varying from 2 to 6 and p ranging from 1 to 6, and a simple branched alkyl chain of not over 5 carbons carrying at least one radical selected from the group consisting of a hydroxyl and an amino group, and in which formula the two X's need not be similar, and Y is a radical selected from the group consisting of hydroxyl and an amino group carrying a reactive hydrogen.

2. A water-soluble, resinous condensation product obtained by condensing at temperatures exceeding 100° C. equimolar quantities of boric acid and a biuret of the following general formula:

wherein z is a small integer of values from 0 to 3 and R is a group —(CH₂)ₜ—(NH(CH₂)ₜ)ₛ— where t and s are small integers with s ranging from 0 to 5 and t ranging from 1 to 5, and in which X is a radical selected from the group consisting of hydrogen,

—(CH₂)ₙ—Y, —(CH₂)ₙ(NH(CH₂)ₙ)ₚ—Y in which n and p are small integers with n ranging from 2 to 6 and p ranging from 1 to 6, and a simple branched alkyl chain of not over 5 carbons carrying at least one radical selected from the group consisting of a hydroxyl and an amino group, and in which formula the two X's need not be similar, and Y is a radical selected from the group consisting of hydroxyl and an amino group carrying a reactive hydrogen.

3. The process of forming a water-soluble resin by condensing 1 mol of monoethanolamine biuret with at least one mol of boric acid at temperatures of above 100° C.

4. The process of forming a water-soluble resin by condensing 1 mol of monoethanolamine biuret with one mol boric acid at temperatures of above 100° C.

5. The process of forming a water-soluble resin by reacting at least one mol of boric acid and one mol of a symmetrical dibeta aminoethyl biuret at temperatures above 100° C.

6. The process of forming a water-soluble resin which comprises reacting one mol of biuret with at least one mol of boric acid at temperatures above 100° C.

7. The process for the forming of mixed water-soluble resins which comprises simultaneously condensing at least one mol of boric acid with one total mol ratio of monoethanol biuret and monoethanolamine at temperatures above 100° C., wherein the mol ratio of monoethanol biuret varies between .51 to 1.

8. A water-soluble, resinous condensation product obtained by condensing at temperatures exceeding 100° C. at least one mol of boric acid and one mol of monoethanol biuret.

9. A water-soluble, resinous condensation product obtained by condensing at temperatures exceeding 100° C. at least one mol of boric acid and one total mol ratio of monoethanolamine and monoethanol biuret wherein the mol ratio of monoethanol biuret varies between .51 to 1.

10. A water-soluble, resinous condensation product obtained by condensing at temperatures exceeding 100° C. at least one mol of boric acid and one mol of a symmetrical dibeta-aminoethyl biuret.

11. The process for the manufacture of a water-soluble resin which comprises reacting at temperatures exceeding 100° C. equimolar quantities of boric acid and a biuret of the following general formula:

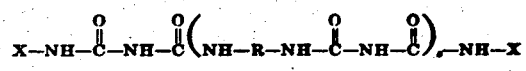

wherein z is a small integer of values from 0 to 3 and R is a group —(CH₂)ₜ—(NH(CH₂)ₜ)ₛ— where t and s are small integers with s ranging from 0 to 5 and t ranging from 1 to 5, and in which X is a radical selected from the group consisting of hydrogen,

—(CH₂)ₙ—Y, —(CH₂)ₙ—(NH(CH₂)ₙ)ₚ—Y in which n and p are small integers with n varying from 2 to 6 and p ranging from 1 to 6, and a simple branched alkyl chain of not over 5 carbons carrying at least one radical selected from the group consisting of a hydroxyl and an amino group, and in which formula the two X's need not be similar and Y is a hydroxyl group.

12. The process for the manufacture of a water-soluble resin which comprises reacting at temperatures exceeding 100° C. equimolar quantities of boric acid and a biuret of the following general formula:

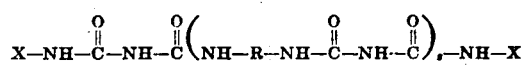

wherein z is a small integer of values from 0 to 3 and R is a group —(CH₂)ₜ—(NH(CH₂)ₜ)ₛ— where t and s are small integers with s ranging from 0 to 5 and t ranging from 1 to 5, and in which X is a radical selected from the group consisting of hydrogen,

—(CH₂)ₙ—Y, —(CH₂)ₙ—(NH(CH₂)ₙ)ₚ—Y in which n and p are small integers with n varying from 2 to 6 and p ranging from 1 to 6, and a simple branched alkyl chain of not over 5 carbons carrying at least one radical selected from the group consisting of a hydroxyl and an amino group, and in which formula the two X's need not be similar and Y is an amino group.

13. A water-soluble, resinous condensation product obtained by condensing at temperatures exceeding 100° C. equimolar quantities of boric acid and a biuret of the following general formula:

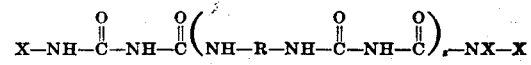

wherein z is a small integer of values from 0 to 3 and R is a group —(CH₂)ₜ—(NH(CH₂)ₜ)ₛ— where t and s are small integers with s ranging from 0 to 5 and t ranging from 1 to 5, and in which X is a radical selected from the group consisting of hydrogen,

—(CH₂)ₙ—Y, —(CH₂)ₙ—(NH(CH₂)ₙ)ₚ—Y in which n and p are small integers with n ranging from 2 to 6 and p ranging from 1 to 6, and a simple branched alkyl chain of not over 5 carbons carrying at least one radical selected from the group consisting of a hydroxyl and an amino group, and in which formula the two X's need not be similar and Y is a hydroxyl group.

14. A water-soluble, resinous condensation product obtained by condensing at temperatures exceeding 100° C. equimolar quantities of boric acid and a biuret of the following general formula:

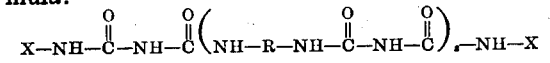

wherein $z$ is a small integer of values from 0 to 3 and R is a group $-(CH_2)_t-(NH(CH_2)_t)_s-$ where $t$ and $s$ are small integers with $s$ ranging from 0 to 5 and $t$ ranging from 1 to 5, and in which X is a radical selected from the group consisting of hydrogen, $-(CH_2)_n-Y$, $-(CH_2)_n-(NH(CH_2)_n)_p-Y$ in which $n$ and $p$ are small integers with $n$ ranging from 2 to 6 and $p$ ranging from 1 to 6, and a simple branched alkyl chain of not over 5 carbons carrying at least one radical selected from the group consisting of a hydroxyl and an amino group, and in which formula the two X's need not be similar and Y is an amino group.

EARLE DAVIS McLEOD.